United States Patent

Graeber et al.

[11] 3,982,873
[45] Sept. 28, 1976

[54] SEALING DEVICE
[75] Inventors: August Graeber; Friedrich Fleischer; Gerhard Werner, all of Coesfeld, Germany
[73] Assignee: Maschinenbau Scholz GmbH & Co. KG, Corsfeld, Germany
[22] Filed: Nov. 19, 1975
[21] Appl. No.: 633,555

[30] Foreign Application Priority Data
Nov. 29, 1974 Germany............................ 2456502
July 30, 1975 Germany............................ 2534004

[52] U.S. Cl. ............................... 425/404; 425/445
[51] Int. Cl.² ...................... B29D 7/20; B29C 25/00; B29H 5/28
[58] Field of Search ............ 425/72, 404, 445, 446, 425/380

[56] References Cited
UNITED STATES PATENTS

| | | | |
|---|---|---|---|
| 3,284,372 | 11/1966 | Bailey | 425/404 X |
| 3,288,317 | 11/1966 | Wiley | 425/404 X |
| 3,517,097 | 6/1970 | Mixell et al. | 425/404 X |
| 3,645,656 | 2/1972 | Stauffer et al. | 425/404 X |
| 3,668,288 | 6/1972 | Takahoski | 425/72 X |
| 3,804,567 | 4/1974 | Recknagel | 425/445 X |

Primary Examiner—J. Howard Flint, Jr.
Attorney, Agent, or Firm—Andrus, Sceales, Starke & Sawall

[57] ABSTRACT

A vulcanizing device in which a member is enclosed in an extruder device and the enclosed member is vulcanized at a predetermined pressure in a vulcanizing tube connected to the extruder device, wherein the vulcanizing tube is placed at a distance from the extrusion device, a sealing device is positioned directly before and coaxially to the vulcanizing tube, the length of the sealing device being less than the said distance, the sealing device contains a sealing housing, whose interior has spaced radial guiding elements which have coaxial openings for the passage of the enclosed member and divide the interior of the sealing housing into individual chambers lying axially behind each other, the sealing housing has an inlet opening between the ends, which is connected as a locking medium to a source, of which the pressure is arranged to be somewhat higher than the pressure in the vulcanizing tube, and the chambers are connected to outlet openings in the sealing housing, which are connected to throttled discharge conduits.

19 Claims, 7 Drawing Figures

SEALING DEVICE

BACKGROUND OF THE INVENTION

This invention relates to a vulcanizing device in which a member is enclosed in an extruder device and the enclosed member is vulcanized in a vulcanizing tube adjoining this at a specified pressure.

It is well known to connect a vulcanizing device for enclosed members direct on to the extruder device, in which the members are enclosed. The member which still has a plastic encasement then enters the vulcanizing device under pressure and is vulcanized there.

The disadvantage has been shown here that the member emerging from the extruder cannot be inspected, or can only incompletely be inspected, for faults, because it is already in the vulcanizing tube.

SUMMARY OF THE INVENTION

It is therefore an object of the invention to provide a vulcanizing device which allows the member to be examined without difficulty after extrusion.

According to the invention, there is provided a vulcanizing device in which a member is enclosed in an extruder device and the enclosed member is vulcanized at a predetermined pressure in a vulcanizing tube connected to the extruder device, wherein the vulcanizing tube is placed at a distance from the extrusion device, a sealing device is positioned directly before and coaxially to the vulcanizing tube, the length of the sealing device being less than the said distance, the sealing device contains a sealing housing, whose interior has spaced radial guiding elements which have coaxial openings for the passage of the enclosed member and divide the interior of the sealing housing into individual chambers lying axially behind each other, the sealing housing has an inlet opening between the ends, which is connected as a locking medium to a source, of which the pressure is arranged to be somewhat higher than the pressure in the vulcanizing tube, and the chambers are connected to outlet openings in the sealing housing, which are connected to throttled discharge conduits.

The advantage of the invention lies in the fact that the freely emerging enclosed member can be inspected very clearly on all sides for faults. The encasement of the member placed in the extrusion device is still plastic and consequently deformable. The invention ensures that the member on entry into the vulcanizing device under high pressure is not impaired or damaged. In the sealing housing a controlled graded locking pressure is produced by means of the locking medium. Preferably, water is used as a locking medium.

For producing the required locking pressure in the sealing tube the pressure head of a column of water is used, for example, which is also acted upon with the pressure in the vulcanizing device.

It is advantageous that the locking medium under pressure thereby enters the sealing housing uniformly from all sides under the same pressure, whereby the encased piece acts equally from all sides and is thus centered in the sealing housing relative to the guiding openings of the guiding elements. For the latter purpose, it is advantageous if the locking medium enters the individual chambers in the sealing housing not only across the guiding openings, but also streams over axial passages or slits between the sealing housing and the guiding elements. Between the individual sealing steps or chambers the locking medium is removed under control, in order that as uniform a reduction as possible is obtained. There are several cases of application in which it is desirable to control the reduction in pressure or the flow-off of the locking medium along the sealing housing or the encased piece. This can be achieved by at least one guiding element being elastically deformable and by providing adjusting means, through which the guiding element is deformable, as required, in the direction of the enclosed member. With this design the split between the guiding element and the piece surface on the one hand, and the guiding element and the sealing housing on the other hand can be systematically controlled and be set so small, as required, that it is almost no longer possible for the locking medium to pass through. This is for example advantageous with the vulcanization of encased lead cable.

The guiding element can for instance be in the form of an elastic sealing ring with a tapered ringshaped inner section. While the outer section of the sealing ring running radially is held firmly to the sealing housing, the position of the tapered ring-shaped inner section can be altered as required by means of suitable adjusting means, whereby a more or less strong tightening to the member surface takes place.

Preferably, an adjusting sleeve which is placed and seals and glides in the sealing housing serves as an adjusting means; this adjusting sleeve is axially deformable by means of an adjusting device, where the adjusting sleeve has, advantageously, a radial flange projecting from the front end of the sealing tube; this flange grips the adjusting device, preferably an adjusting cylinder.

The pressure of the locking medium in the area of entry of the vulcanizing tube is slightly higher than the pressure of the steam in the vulcanizing tube, in order to prevent the steam from being pressed outwards. Nevertheless, the steam and locking medium, preferably water, naturally meet, and condensed steam and water are removed from the chamber next to the vulcanizing tube entry. Through uncontrolled contact of steam and water damage can arise on the casing which is still plastically deformable. It is therefore advantageous to place, between the entrance to the vulcanizing device and the sealing housing, a transition housing, which has at least a partition with an opening for conveying the enclosed member. Through the partition which is preferably perforated, the contact of steam with the water is so stabilised that undesired fluctuations on the casing are avoided.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
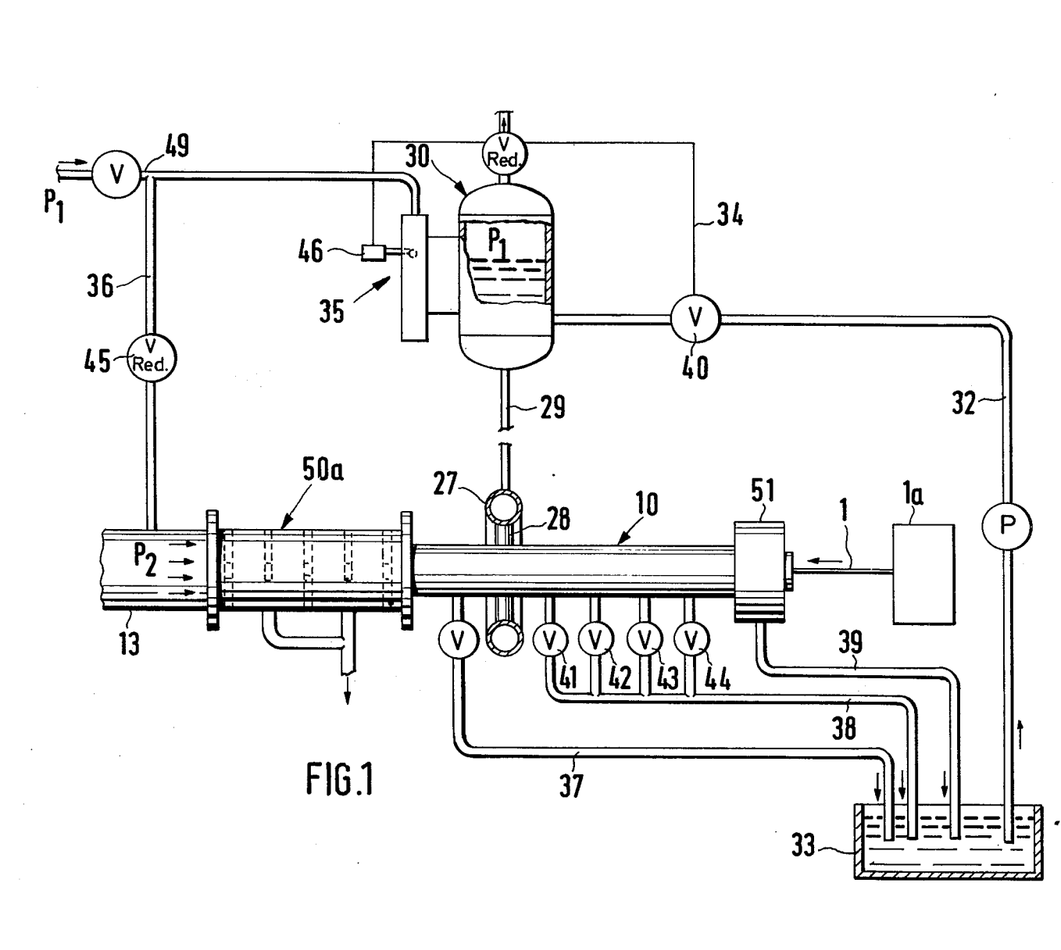
FIG. 1 shows schematically the individual components of the device according to the invention.

A sealing device is coupled to a vulcanizing tube 13 for vulcanizing enclosed members, such as cables, rods, pipes, etc., and only the housing in the form of a sealing tube 10 is shown in FIG. 1. The member 1, which is enclosed in plastics material in an extrusion device 1a first runs through a free strip which can be in the form of a testing strip (not shown) before it enters the sealing device.

Between the sealing tube 10 and the vulcanizing tube 13 there is a transition housing 50a. The sealing tube 10 is surrounded by a ring conduit, which is connected to the sealing tube 10 across several radial connecting pieces 28. Water is led to the ring circuit 27 through the conduit 29 under pressure, from the water container 30 which is acted upon through the steam conduit 49 with steam pressure P1, which is higher than the pressure P2 in the vulcanizing tube 13, since a pressure-reducing valve 45 is interposed between the vulcanizing tube 13 and the steam pressure conduit 49 in the connecting conduit 36.

Figure 3:
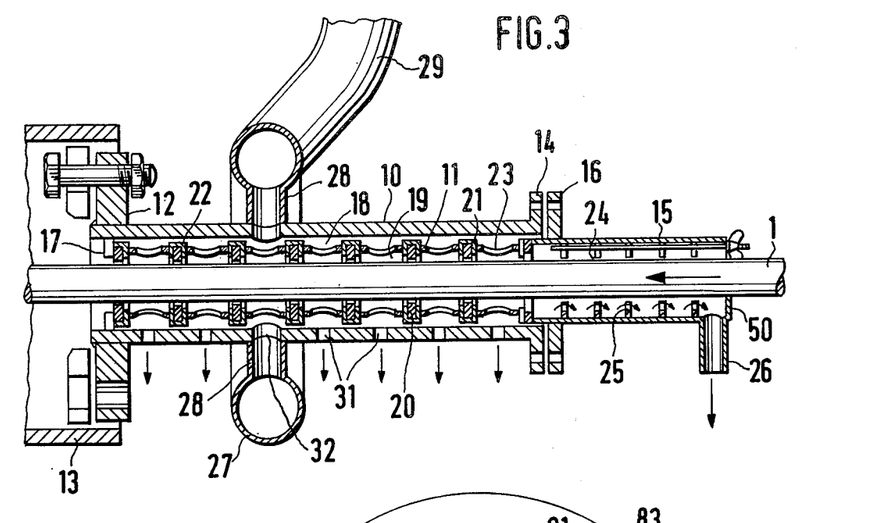
FIG. 3 shows a section of an entry sealing device for the device of FIGS. 1 or 2.

In the embodiment according to FIG. 3, the member 1 extruded from the extrusion device, after it has passed over a free strip for inspection purposes, enters the sealing tube 10, in which it is led into a guiding tube 11. By means of a flange 12 the sealing tube 10 is screwed at one of its ends to a vulcanizing tube 13. A further flange 14 at the other end of the sealing tube 10 serves to fasten the guiding tube 11, which extends coaxially into the sealing tube 10 and has a free end 15, which projects out of the sealing tube 10. The guiding tube 11 fastened with a flange 16 to flange 14 of the sealing tube extends in the sealing tube 10 as far as approximately the end on the side of the vulcanizing tube, where it is supported on a circular shoulder 17 in the sealing tube 10, and where it can be radially adjusted by a compensator in the working condition or can be centered with respect to the moving member 1.

The guiding tube 11 forms with the sealing tube inside wall and the member surface in each case coaxially running annuli 18, 19 which are separated into chambers at axial distances by means of guiding elements 20 and their holders 21 in the guiding tube 11. The chambers of the annulus 18 are disposed in flow connection in the axial direction by means of passages 22 between the holders 21 and the sealing tube inner wall. Through radial passages 23 in the guiding tube 11 the respectively radially adjacent chambers of the annuli 18 and 19 also are disposed in flow connection. The axially adjacent chambers of the annulus 19 are more or less separated from each other through the leading contact of the guiding elements 20 with the member surface. Since however there is a certain play between member 1 and guiding elements 20 no absolute division of the chambers takes place. The end 15 projecting from the sealing tube 10 of the guiding tube 11 also has guiding elements 24 forming chambers with axial passages 25 adjacent to the member 1 for water to pass through. The chamber adjacent to the entry opening of the section 15 is connected to a water outlet connecting piece 26. Corresponding to the respective piece diameter, both the guiding elements 20 in the guiding tube 11 and also the guiding elements 24 in the projecting part 15 of the guiding tube 11 are exchangeable.

Connecting pieces 28 and ring conduit 27 lie in a plane vertical to the longitudinal axis of the sealing tube 10.

The sealing tube positioned essentially horizontally is provided with water outlet openings 31 at an axial location in its area which is lower when in use; these water outlet openings are so positioned that each chamber of the outer annulus 18 has an outlet, except the chamber, which together with passage openings 32 placed on the circumference of the sealing tube 10, are connected across the connecting pieces 28 with the ring conduit 27.

The ring conduit 27 and the chamber of the outer annulus 18 connected to it are positioned nearer to the vulcanizing tube 13 than to the entry end of the sealing tube 10.

As shown in FIG. 1 the water container 30 is connected to an inlet pipe, in which a controllable inlet valve 40 and a pump P are provided. The pump P is connected to a water reservoir 33. The inlet valve 40 is connected by means of a pilot circuit 34 to a continuously working differential pressure control 35 on the water container 30. The differential pressure control 35 has a connecting conduit 36 provided with a pressure reducing valve 45 connected with the vulcanizing tube 13. Furthermore, the differential pressure control 35, consequently also the water container 30, is connected to a steam pressure feed pipe 49, in which the steam pressure $P_1$ prevails. The water outlet openings 31 and the outlet connecting pieces 26 are connected to the water reservoir 33 across conduits 37, 38 and 39.

During operation of the device the water from the water container 30 standing under pressure enters the ring conduit 27 across the fall conduit 29, and the sealing tube 10 across the connecting pieces 28. The pressure in the sealing tube corresponds here to the operative height of the column of water in the water container and the conduit 29 plus the steam pressure $P_1$, which is guided across the differential pressure control 35 into the water container 30. In the vulcanizing tube 13 the pressure $P_2$ reduced by the pressure reducing valve 45 prevails.

The water is distributed in the ring conduit 27 on all sides and passes through the connecting pieces 28 into the chamber of the outer annulus 18 adjacent to the openings 32 (FIG. 3). Through the openings 23 in the guiding tube 11 the water reaches the radially inner chamber of the inner annulus 19 and consequently comes into contact with the enclosed member 1. Since the water reaches the member 1 uniformly from all sides under the same pressure, there occurs a locking-means-sealing completely centered to the member 1 against the somewhat low steam pressure in the vulcanizing tube 13.

The water standing under pressure now attempts to distribute itself to all sides. Here, the water flows through the axial passages 22 in the direction towards the vulcanizing tube 13, in which a lower pressure prevails, and is distributed in the following chambers of the outer and inner annulus, which are connected to each other through openings 23. Furthermore, during the passage of the piece 1, water is carried through the sealing tube 10 out of the chambers, which lie in the plane of the ring conduit 27 and the connecting pieces 28, between the piece surface and the guiding element 20 in the direction towards the vulcanizing tube 13 and consequently into the chambers of the inner annulus 19, which gives rise to a protective decrease in friction between guiding elements 20 and the encasing of the member. Since the pressure of the water decreases with increasing distance from the chambers assigned to the ring conduit 27, there prevails in the last chambers of the annuli in front of the vulcanizing tube 13 a water pressure, which corresponds approximately to the steam pressure in the vulcanizing tube 13. The water which is slowed down in the axial direction collects with decreasing pressure in the lower area of the sealing tube 10, and together with small quantities of condensed steam, which has passed from the vulcanizing tube 13 into the sealing tube 10, leaves the sealing tube 10 through the outlets adjoining the chambers, and is led off into the reservoir 33.

At the end of the sealing tube 10 where the member enters, the water meets atmospheric pressure, and consequently passes, led by the system of the annuli 18 and 19 and the chambers formed by the guiding elements 20, 24 through the sealing and guiding tube 10, 11 as described above, where it flows around and cools the piece and consequently pre-hardens it. Since the member 1, when it moves, takes with it on its surface a certain amount of water adhered to it, there is formed between the surface and the guiding elements 20, 24 a protective film, which further reduces the friction between the guides and the encasing as described above. The valves 41, 42, 43, 44 provided between the outlets 31 and the connecting conduit 38 to the water reservoir 33 make possible a controlled pressure setting or regulating of the quantity of locking water in the sealing tube 10, so that for example the extent and intensity of the stream in the sealing tube 10 can be regulated with equal or varying strengths of the member.

Since the locking water runs continuously out of the sealing tube 10, the inflow to the water container 30 must be controlled in such a way for maintaining a constant pressure in the sealing tube, that the height of the operative column of water remains the same.

The water surface in the water container 30 and consequently the operative height of the column of water is kept even by means of a floating device in the control 35; thereby the inlet valve 40 is controlled by the floater 46 in such a way that with sinking below or rising above a specified water gauge level, the valve 40 opens or closes (FIG. 1).

Figure 2:
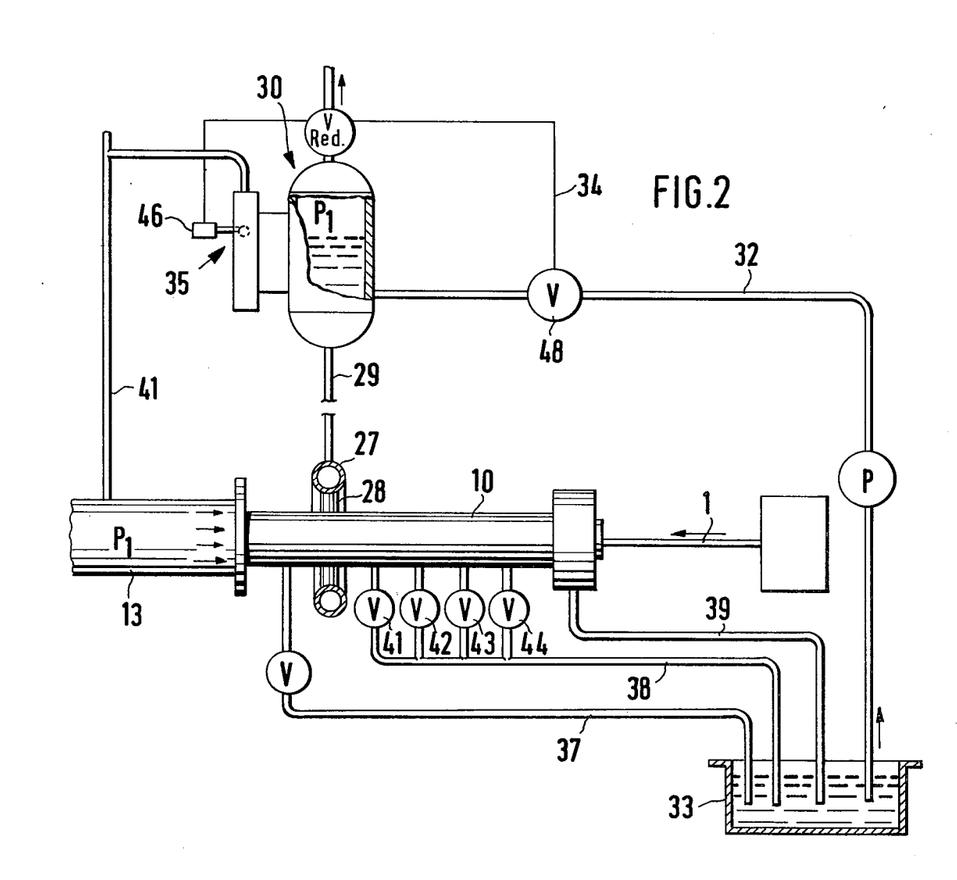
FIG. 2 shows schematically another embodiment of the invention.

With the embodiment shown in FIG. 2 the same steam pressure prevails in the vulcanizing tube 13 and in the water container 30. The height of the excess pressure in the sealing tube 10 now depends solely on the height of the operative column of water. As soon as the height in the water container, which is fixed by a continuously working differential pressure control 35, sinks, so much water is restored into the water container across pump P and the control valve 48, until the fixed pressure is reached again.

Figure 4:
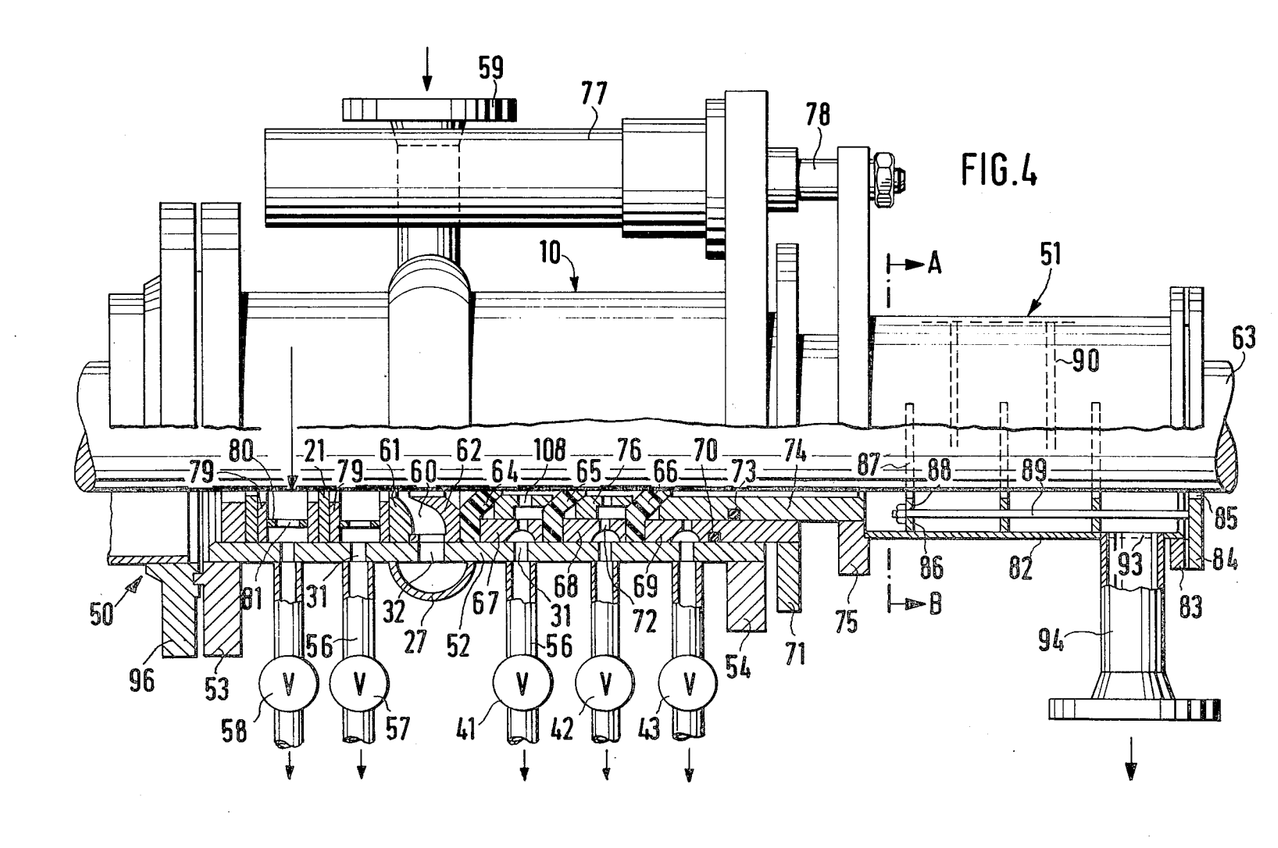
FIG. 4 shows a section through a modified entry sealing device.

With the embodiment shown in FIG. 4, the sealing housing 10 has a tube piece 52 with flanges 53, 54 welded on to both ends. The tube piece 52 is provided with radial openings 31, where discharge pipes 56 are welded with the tube 52 in the area of the openings 31. The discharge pipes 56 are connected with the valves 41 to 43 or 57 and 58 for the controlled discharge of sealing water, as will be described later.

The tube 52 is surrounded by the ring conduit 27, which is connected across a row of radial openings 32 with the interior of the tube 52. The ring conduit 27 is connected across the connecting cross pieces 59 to the conduit 29 shown in FIGS. 1 and 2.

The openings 32 are connected with a ring-shaped circular distribution channel, which is formed from spaced rings 61, 62. The distribution channel 60 is bent in the axial direction so that a strong water jet which may possibly arise does not directly strike the surface of the enclosed member, here a lead cable 63.

On the entry side of the cable 63 in relation to the ring 62 there are three elastomeric sealing elements 64, 65 and 66 at axial distances in the tube piece 52. The ring-shaped sealing elements 64 to 66 have an outer radial section and an inner tapered ring-shaped section. The radial section of the sealing element 64 lies on one side against the ring 62, whereby a ring-shaped distance piece 67 presses the radial section against the ring 62. The radial section of the sealing element 65 is held between the spacing piece 67 and a further spacing piece 68, which are both positioned so that they glide. The radial section of the sealing element 66 is held between the spacing piece 68 and the adjoining end of a casing 69, which is positioned in the tube piece 52 by means of a sealing ring 70, and which seals and glides, and is welded at the other end with a radial flange 71. The flanges 54 and 71 can be braced together by fasteners, not shown, for example, bolts, where the sealing elements are likewise held under tension. The spacing pieces 67, 68 or the casing 69 are provided with openings 72, which are connected with the openings 31 of the tube piece. Within the casing 69 a sleeve 74 is fixed with the help of a sealing ring the sleeve seals and glides and projects out of the casing 69 with a section on to which a radial flange 75 is welded. The sleeve 74 has a somewhat larger inner diameter than the outer diameter of the cable sheathing 63. It is positioned with its inner end against the tapered ring-shaped section of the sealing element 66. Between the tapered ring-shaped sections 65 and 66 or 65 and 64, ring-shaped spacing pieces 76 are positioned with an axial section, which are positioned so that they glide on the spacing pieces 67, 68. The flange 75 of the sleeve 74 is connected to hydraulic adjusting cylinders, of which one is shown at 77 in FIG. 2, which is fixed to the flange 54 in a way not shown in closer detail. Its piston 78 is screwed to the flange 75. With the help of the adjusting cylinder 77 the sleeve 74 is pressed more or less into the tube piece 52, so that the tapered ring-shaped sections of the sealing elements 64 to 66 become too deformed more or less in the radial direction towards the cable sheathing, in order to alter the slit between the sealing element 64 to 66 and the cable 63, and to eliminate it.

On the side of the tube piece 52 turned towards the ring 61 the guiding elements 21 are positioned at an axial distance; these are in each case fixed between fastening rings 79, which for their part are held at a distance with the help of distance rings 80 with openings 81. The fastening of the guiding elements 21 corresponds approximately to that shown in FIG. 3.

The entry housing 51 has, welded on to the flange 75, a tube housing 82, which is welded at the entry end with a ring flange 83, with which a further ring flange 84 is connected with an entry opening 85 for the cable, for example by screw coupling. In the tube housing 82 there are three lower radial segments 86 with circular recesses 87. The segments 86 have openings 88 aligned with each other, through which a bolt 89 is guided for the purpose of fastening to the ring flange 84. In the tube housing 82 there are also two upper segments 90 at an axial distance, which in each case extend axially and lie between the segments 86. As can be seen from FIG. 5, the segments 90 also have circular recesses 91, which in each case are offset by 180° against the recesses 87. As can also be seen in FIG. 5 the segments 86 or 90 enclose somewhat more than a cross section half of the cable 63, where the ends have openings 92 aligned with each other in order to guide a bolt through for fastening the segments 86 and 90 together and to the flange 84.

At the entry end of the cable 63 the tube housing 82 has an opening 93, over which water flows off into a connecting piece 94, which is connected to the conduit 39 shown in FIG. 1 or FIG. 2.

Figure 5:
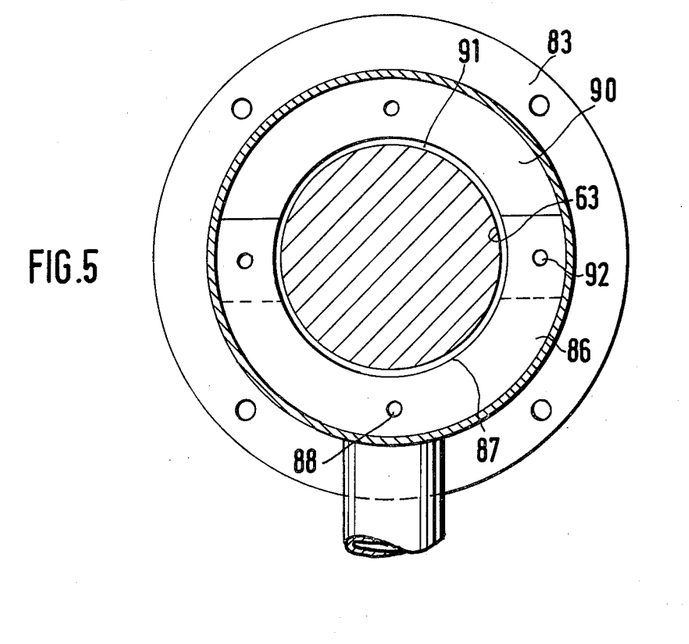
FIG. 5 shows a section of the entry housing of the device of FIG. 4 taken along the line A–B.

The segments 86 and 90 with the recesses 87 or 91 form a labyrinth-type entry sealing or guide for the entering cable 63.

Figure 6:
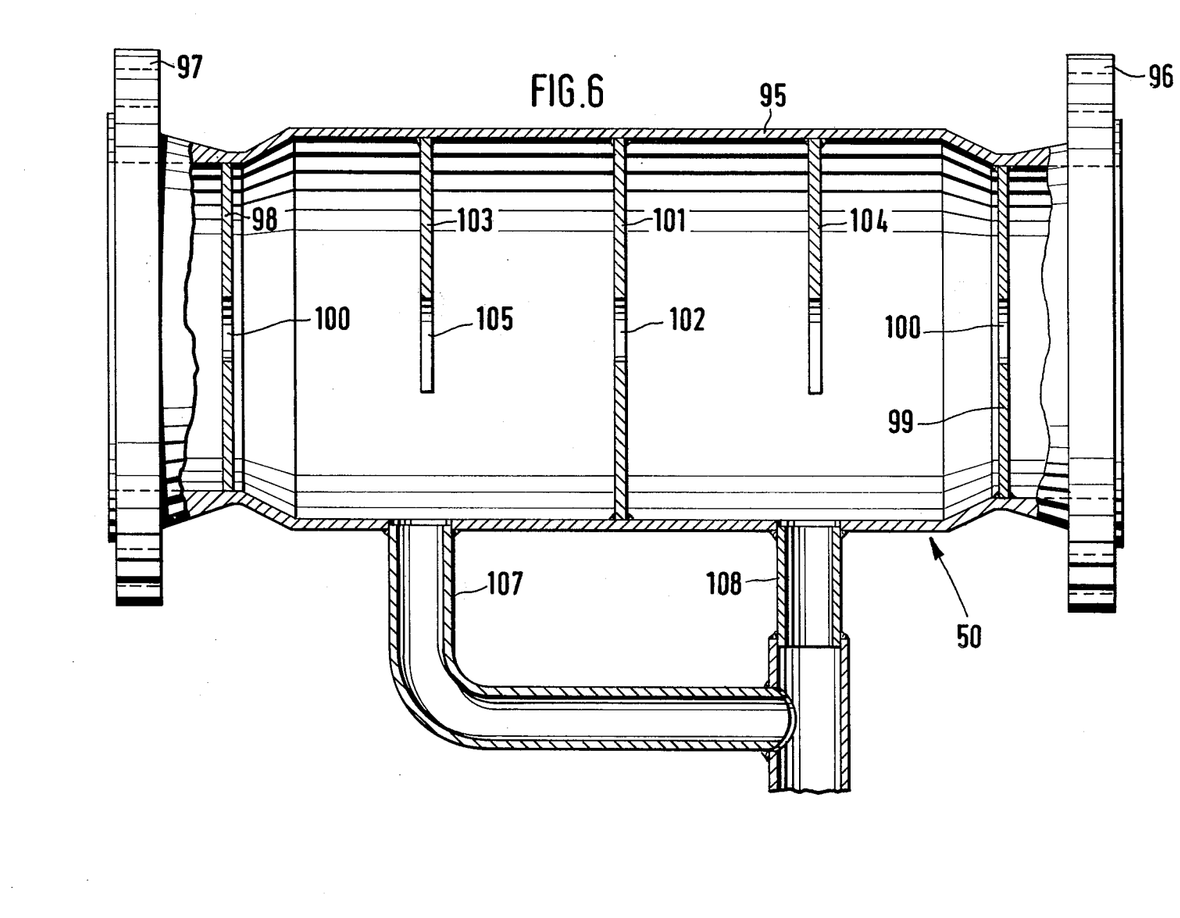
FIG. 6 shows a section of the linking housing of FIG. 1.
Figure 7:
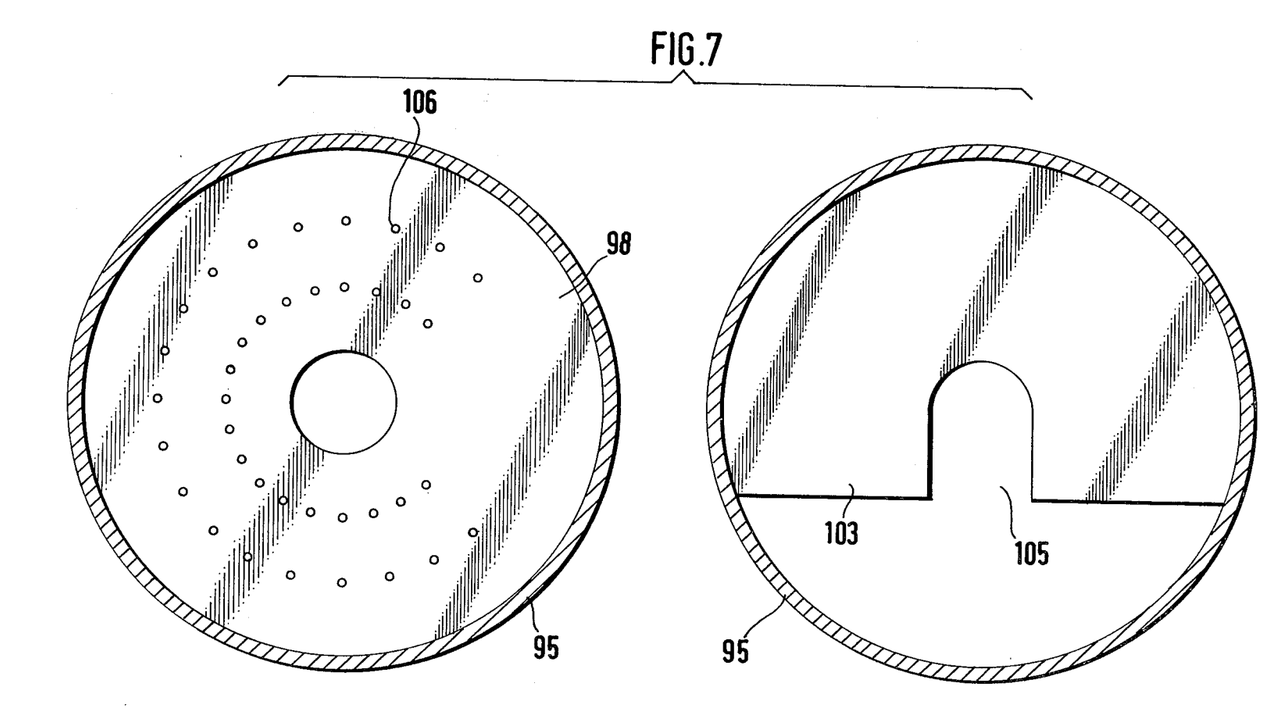
FIG. 7 shows two sections through the housing according to FIG. 6, one in the direction towards a partition, and one in the direction towards a guiding element.

The transition housing 50 (FIGS. 1, 6 and 7) will be described more fully below. It has a housing 95 which is also tube-shaped with welded ring flanges 96 and 97 for fastening to the flange 53 of the tube piece 52 (FIG. 4) or to the vulcanizing tube 13 (FIG. 1). In the end areas, separating sheets 98, 99 running crosswise are provided with central openings for the cable, not shown, to pass through. Furthermore, approximately in the center of the housing 95 there is a further separating sheet 101 running crosswise with a central opening 102, which is equipped with the openings 100. Between the separating sheets 98 and 101 or 101 and 99 there are radial separating sheets 103, 104 with recesses 105, which are aligned with the openings 100 and 102. The separating sheets 98, 99 and 101 are provided with a row of holes. In FIG. 7 the separating sheet 98 is shown with a side view with holes 106, which are separated on concentric circles around the axis.

In the transition housing 50 the steam emerging from the vulcanizing tube 13 (FIG. 1) and the sealing water coming from the sealing tube 10 meet, and during this the separating walls 98 to 101 ensure a sufficient stabilizing to prevent damage to the cable casing. Condensed steam and water are discharged across discharge connecting pieces 107, 108 on both sides of the separating wall 101.

We claim:

1. A vulcanizing device in which a member is enclosed in an extruder device and the enclosed member is vulcanized at a predetermined pressure in a vulcanizing tube connected to the extruder device wherein said vulcanizing tube is placed at a distance from said extrusion device, a sealing device is positioned directly before and coaxially to said vulcanizing tube, the length of the sealing device being less than the said distance, a sealing housing is contained in said sealing device, spaced radial guiding elements are provided in the interior of said sealing housing having coaxial openings for the passage of said enclosed member and dividing the interior of said sealing housing into individual chambers lying axially behind each other, an inlet opening is provided between the ends of said sealing housing, which opening is connected to a source of a locking medium, the pressure of which is arranged to be somewhat higher than the pressure in said vulcanizing tube, and said chambers are connected to outlet openings in said sealing housing, which are connected to throttled discharge conduits.

2. A device as claimed in claim 1, in which an axial passage is provided between said guiding elements and the inner wall of said sealing housing.

3. A device as claimed in claim 1, in which an exchangeable guiding tube is provided within said sealing housing, on which tube the guiding elements are positioned and which is provided with radial openings between the guiding elements.

4. A device as claimed in claim 3, in which said sealing housing is tube-shaped and said guiding tube is not held concentric in said sealing housing.

5. A device as claimed in claim 1, in which the inlet opening for the locking medium source lies nearer to the end of said sealing housing turned towards said vulcanized tube.

6. A device as claimed in claim 5, in which several inlet openings are provided, placed at a uniform distance across the circumference of the sealing housing, said inlet openings being connected across connecting pieces to a ring conduit which is connected to the source for said locking medium.

7. A device as claimed in claim 1, in which said source for the locking medium has a first reservoir, which is connected to said inlet opening in said sealing housing and to an inlet pipe leading to a second reservoir for a locking medium, in which inlet pipe there is a control valve and a pump, and said first reservoir is furthermore connected to a pressure source, of which the pressure is arranged to be the same as or larger than the pressure in said vulcanizing tube.

8. A device as claimed in claim 7, in which a differential pressure control is attached to said first reservoir, which control is adapted to sense the pressure of the pressure source and the pressure in said first reservoir and which is adapted to open the control valve, if the pressure in said first reservoir falls below a specified value.

9. A device as claimed in claim 8, in which said pressure source is the steam pressure source for said vulcanizing tube, which source is connected to the vulcanizing tube directly or across a pressure reducing valve and is connected at the same time to said first reservoir.

10. A device as claimed in claim 1, in which at the end turned towards the extrusion device the chambers of said sealing housing have no outlet openings between said guiding elements, and said guiding elements are segments, which are provided with guiding recesses, which take at least a cross section half of the piece, and which are offset from each other in the circumferential direction, preferably in each case by 180°.

11. A device as claimed in claim 1, in which at the end turned towards the extrusion device said sealing housing has an unthrottled outlet opening.

12. A device as claimed in claim 1, in which at least one guiding element is elastically deformable and adjusting means are provided, through which said guiding element is deformable, as required, in the direction of said enclosed member.

13. A device as claimed in claim 12, in which said guiding element is formed as an elastic or elastomeric sealing ring with a tapered ring-shaped inner section.

14. A device as claimed in claim 13, in which said adjusting means have an adjusting case which seals and glides in said sealing housing, and said adjusting case can be moved axially by means of adjusting means.

15. A device as claimed in claim 14, in which said adjusting casing has, projecting from the front end of the sealing tube, a section to which the adjusting device is fastened across a radial flange, the adjusting device being in an adjusting cylinder.

16. A device as claimed in claim 12, in which axially movable spacing elements provided with a radial passage are provided between the individual deformable guiding elements.

17. A device as claimed in claim 1, in which a transition housing is provided between the entrance to said vulcanizing device and said sealing housing, which transition housing has at least one separating wall with openings for conveying the enclosed member.

18. A device as claimed in claim 17, in which at the ends of said transition housing there is in each case a separating wall and in the central area a further separating wall, and between these there are provided radial guiding elements with a guiding recess, which only extend across a part of the circumference of said transition housing.

19. A device as claimed in claim 17, in which said separating walls are perforated.

* * * * *